(12) United States Patent
Nakafuji et al.

(10) Patent No.: US 10,190,229 B1
(45) Date of Patent: Jan. 29, 2019

(54) INTERIOR PLATING AND AUTOMATED SURFACE-DEPOSITION SYSTEM

(71) Applicant: Oceanit Laboratories, Inc., Honolulu, HI (US)

(72) Inventors: Glen Nakafuji, Honolulu, HI (US); Ganesh Kumar Arumugam, Honolulu, HI (US); Vinod Veedu, Houston, TX (US); Matthew Nakatsuka, Honolulu, HI (US)

(73) Assignee: OCEANIT LABORATORIES, INC., Honolulu, HI (US)

( * ) Notice: Subject to any disclaimer, the term of this patent is extended or adjusted under 35 U.S.C. 154(b) by 291 days.

(21) Appl. No.: 15/003,784

(22) Filed: Jan. 21, 2016

Related U.S. Application Data

(60) Provisional application No. 62/106,201, filed on Jan. 21, 2015.

(51) Int. Cl.
*B05D 1/02* (2006.01)
*B05D 3/00* (2006.01)
*B05D 3/06* (2006.01)
*C25D 5/06* (2006.01)
*C25D 5/48* (2006.01)
*C25D 7/04* (2006.01)
*C25D 17/14* (2006.01)
*F16L 55/26* (2006.01)

(52) U.S. Cl.
CPC ............. *C25D 5/06* (2013.01); *B05D 1/02* (2013.01); *B05D 3/007* (2013.01); *B05D 3/067* (2013.01); *C25D 5/48* (2013.01); *C25D 7/04* (2013.01); *C25D 17/14* (2013.01); *F16L 55/26* (2013.01); *B05D 2202/00* (2013.01); *B05D 2254/04* (2013.01); *B05D 2350/65* (2013.01)

(58) Field of Classification Search
CPC ........ F16L 55/26–55/48; F16L 58/02–58/109; B05C 7/08; B05C 7/00; B05C 7/06; C25D 7/04
USPC .................................................. 118/317–318
See application file for complete search history.

(56) References Cited

U.S. PATENT DOCUMENTS

2013/0153432 A1* 6/2013 Jones .................. C25D 3/562
205/96
2013/0167965 A1* 7/2013 Cheney .................. F16L 9/14
138/146
2013/0269812 A1* 10/2013 Redmond ............ B05B 3/1057
137/899

\* cited by examiner

*Primary Examiner* — Bryan D. Ripa
*Assistant Examiner* — Ho-Sung Chung
(74) *Attorney, Agent, or Firm* — Symbus Law Group, LLC; Clifford D. Hyra

(57) ABSTRACT

A new system has a plurality of modular segments flexibly attached to one other and a source of electrical power and plating and coating solutions at the rear of the plurality of modular segments. The plurality of modular segments include a drive stage configured to push the plurality of modular segments along a surface, a plating stage configured to apply the plating solution to the surface under a pre-set operating current density to deposit metal or metal alloy onto the surface, a surface treatment application stage configured to apply the coating solution to the surface, and a curing stage configured to cure the coating solution to form a final coating on the surface that is resistant to corrosion, chemical attacks and chemical buildup.

23 Claims, 2 Drawing Sheets

INTERIOR PLATING AND AUTOMATED SURFACE-DEPOSITION SYSTEM

FIELD OF THE INVENTION

The application relates generally to the oil and gas, aviation, civil engineering, marine engineering and defense industries, and particularly to the refurbishing and reconditioning and application of surface coatings to interior metallic surfaces.

BACKGROUND

Brush plating and spray coating are traditionally used to apply coatings to metallic surfaces. Coating large interior surfaces with these techniques is difficult due to the restricted space and limited access, and the durability and applicability of the coatings themselves may be compromised or inherently limited. Reaching interior surfaces such as pipeline interiors is difficult, but can be done with pig-like vehicles equipped with sprayers. However, these vehicles only apply a spray-on coating. In a corrosive environment, typical spray-on coatings are subject to failure should any one spot or area of pipe surface become exposed. Corrosion and/or buildup may occur in that one spot and then expand and fail entire areas of coating.

Needs exist for improved systems and methods for coating, treating and/or reconditioning interior or other difficult to reach surfaces.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In certain embodiments, the disclosed embodiments may include one or more of the features described herein.

A new system has a plurality of modular segments flexibly attached to one another and sources of electrical power and plating and coating solutions. The plurality of modular segments include a drive stage configured to push the plurality of modular segments along a surface, a plating stage configured to apply the plating solution to the surface, and a surface treatment application stage configured to apply the coating solution to the surface, which will cure to form a final coating on the surface that is resistant to corrosion, chemical attacks and chemical buildup. The sources of electrical power and plating and coating solutions may be at the rear of the plurality of modular segments. The plurality of modular segments may be flexibly attached to one another in a known fashion by connection points and the front and/or rear of each modular segment. The surface treatment application stage may be configured to apply the coating solution to the surface under a pre-set operating current density to deposit metal or metal allow onto the surface. The modular segments may also include a curing stage configured to cure the coating solution to form the final coating on the surface, made up of the plating formed by the plating solution and the cured top coating.

The plating stage may include radial applicators configured to apply the plating solution from the source of plating solution to a portion of the surface that surrounds the plating stage and the surface treatment application stage may include nozzles configured to spray the coating solution from the source of coating solution to a portion of the surface that surrounds the surface-treatment application stage. The curing stage may be located behind the plating stage and surface-treatment application stage and include a thermal and/or UV curing device for applying thermal and/or UV energy to a portion of the surface that surrounds the curing stage to cure coating solution applied by surface-treatment application stage.

The sources of electrical power and plating and coating solutions may include one or more umbilicals. The sources of electrical power and plating and coating solutions may be carried by a self-powered system at the back of the drive stage configured to drive along a coating path, having a battery as the source of electrical power and reservoirs of plating and coating solutions as the sources of plating and coating solutions.

The final coating may include a base layer that is corrosion-resistant (formed by the plating solution) and a top layer that is resistant to deposits (formed by the coating solution). The corrosion-resistant base layer may include metal or alloy. The metal or alloy may include at least one of nickel, chromium, cobalt, copper, selenium, zinc, and phosphorus. The corrosion-resistant base layer may include PTFE, for example in combination with nickel plating to form a composite layer. The top layer may be a composite coating that is inert to acids, bases, and hydrocarbon-based fluids, particularly oil and gas coming from a reservoir and being carried by a pipeline being coated by the system. The top layer may be a composite coating that is inert to sulfuric acid, nitric acid, hydrochloric acid, potassium hydroxide and sodium hydroxide. The top layer may be a composite coating that resists buildup of scale, hydrate, asphaltenes, wax, and debris. The top layer may be a composite coating comprising perfluoro monomers and/or polymers that are resistant to oil and water.

The final coating may be applicable to iron-based metal tubing and conduits. The modular segments may have a circular cross-section or a rectangular cross-section. The surface may be planar. The plurality of modular segments may be flexibly attached to one other by connection points at the front and/or rear of each modular segment. The plating stage may be located in front of the surface-treatment application stage, and the surface-treatment application stage may be located in front of the curing stage.

A new method involves driving a plurality of flexibly attached modular segments along a surface, the plurality of modular segments including a drive stage, a plating stage, a surface treatment application stage and a curing stage, applying a plating solution to the surface using the plating stage under a pre-set operating current density to deposit metal or metal alloy onto the surface, applying a coating solution to the surface using the surface treatment application stage, and curing the coating solution using the curing stage to form a final coating on the surface that is resistant to corrosion, chemical attacks and chemical buildup. Applying the plating solution may involve injecting the plating solution into a metal rotary sponge and moving the sponge against the surface, applying the coating solution may include spraying the coating solution from nozzles onto the surface, and curing the coating solution may include applying thermal and/or UV energy to the surface.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art.

DETAILED DESCRIPTION

Figure 1:
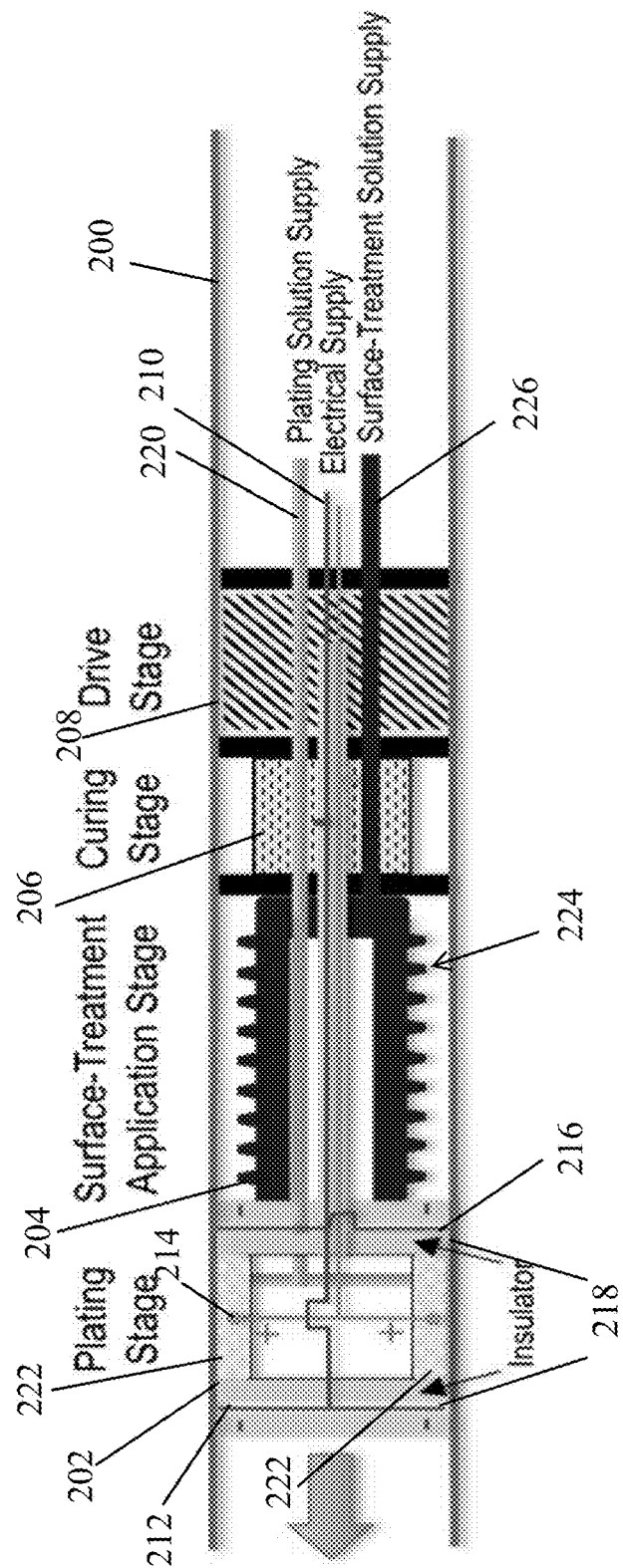
FIG. 1 is an IPASS (Interior Plating and Automated Surface-Deposition System) system assembly for refurbishing large industrial pipelines, in an embodiment.

An interior plating and automated surface-deposition system (IPASS) will now be disclosed in terms of various exemplary embodiments. This specification discloses one or more embodiments that incorporate features of the invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The figures are not to scale. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail.

As used herein, the term "and/or" includes any and all combinations of one or more of the associated listed items. As used herein, the singular forms "a", "an" and "the" are intended to include the plural forms as well, unless the context clearly indicates otherwise.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In embodiments, the IPASS is an automated system that can be used to coat and/or refurbish and recondition large, interior metallic surfaces to resist corrosion and build-up of deposits, both in industrial machinery/structures and for infrastructure and vehicles exposed to natural environments. IPASS can re-coat and refurbish protective coatings on interior metal surfaces of industrial, civil and defense infrastructure without having to remove and replace surfaces.

IPASS accomplishes this in embodiments by having modular, connected robotic units that sequentially apply metal plating coating and a variety of surface treatments. The IPASS hardware and technique is applicable with nano-engineered surface treatments, portable metal deposition systems, and multifunctional corrosion resistant coatings, as described for example in U.S. patent application Ser. No. 14/957,512, filed Dec. 2, 2015, which is hereby incorporated by reference. The IPASS technique and associated coatings can be applied to the interiors of large contiguous metal surfaces that are planar, cylindrical or circular in geometry. The IPASS assembly is generally designed to match the geometry of the surface on which it is used, so for example rectangular interior surfaces may use IPASS assemblies of rectangular cross-section of approximately the same size. When working with planar surfaces, flat electrodes may be used for plating and applicators may for example move laterally rather than circumferentially. The IPASS application domain includes but is not limited to: pipelines and cylindrical vessels, ship and aircraft hulls, metal walls, partitions and barriers, industrial and civil infrastructure storage tanks (cylindrical or spherical), open tanks, reservoirs and similar structures.

One application of IPASS is in the refurbishment and reconditioning of the interior surfaces of production or distribution pipelines in the oil and gas (O&G) industry. Pipelines in the O&G industry may transport a variety of substances ranging from unrefined hydrocarbon mixtures to refined petroleum products. Such pipelines, like well production pipes and other pipes used to carry hydrocarbons, tend to experience significant interior corrosion over time. In the O&G industry, the area of flow assurance covers the minimization of corrosion damage and buildup of flow surface deposits that negatively influence product flow and production costs. Flow surface deposits may include corrosion, hydrate buildup, scale, asphaltene and other substances. The type, rate and degree of surface deposit buildup is determined by the fluids, operating conditions and environmental effects experienced by pipelines.

Current technology used to clean large interior surfaces range from manual shot blasting to automated grinding/cleaning devices designed to remove scale buildup, corrosion and unwanted coatings. Specialized devices, known as "pigs", are used in the case of oil and other industrial pipelines to clear and diagnose the condition of the interior surfaces of pipelines. Pigs are automated systems that are inserted into pipelines and subsequently traverse a length of pipeline to either mechanically remove surface deposit buildup or to diagnose the condition of the pipeline with various diagnostic payloads.

IPASS in embodiments is designed to recondition and/or coat interior surfaces using a sequential plating/surface-treatment/coating process delivered using a modular automated system. An illustration of an IPASS process and system assembly in an embodiment for the refurbishment of existing large industrial pipelines is shown in FIG. 1.

The IPASS system for pipelines as shown in FIG. 1 is a cylindrical set of modules/stages 202, 204, 206, 208 flexibly connected to enable the stages to flexibly traverse the bends in pipelines. In embodiments, the individual modules/stages may be mounted on an articulating chassis. In contrast to a conventional pipeline pig, the IPASS system in the illustrated embodiment has an electrochemical process plating stage 202 that deposits a base passivation layer of metal plating on existing pipeline surfaces to resist corrosion and fluid deposit adhesion and prevent the failure of subsequent coatings (such as omniphobic or multifunctional corrosion resistant coatings to repel scale buildup and other fluid deposit buildup) upon spot failure. This multi-layer treatment provides a significant increase in resistance of scale/deposition-buildup that can impede fluid flow and compromise production operations in industrial pipelines.

The plating stage 202 may utilize metal sponges 222 and mesh applicators to apply electrolyte solution (also referred to as plating solution) to the interior surface of the pipe 200 under a pre-set operating current density, which may be 0.1 mA/cm$^2$ or greater, set by the electrical supply 210 through electrical contacts 212, 216, 214 in the front and rear and central surfaces of the stage, respectively, (separated by insulators 218) for metal deposition. For example, rotary sponges 222 may spin within the pipe while electrolyte/plating solution is injected into the sponges 222 and/or between the sponges and the interior surface through holes in the sponges 22 via an umbilical supply 220 or local reservoir (detailed below). In a typical plating process, the interior of the pipe 200 that needs to be plated is connected to the negative terminal 212, 216 and the brush/sponge in contact with the pipe is connected to the positive terminal 214 of a power supply and both are insulated to prevent any short circuiting. The electrolyte/plating solution may be a known electroplating solution used for metal plating, with for example nickel, copper, chromium, etc.

This plating stage is followed by a polymer (surface-treatment) application stage that is used to apply specialized coatings, including the multifunctional corrosion resistant coating of U.S. Ser. No. 14/957,512. This stage is separated from the plating stage by an insulator 218 and utilizes a set of radially arrayed sprayer nozzles 224 that coats the interior of the pipe 200 by spraying surface-treatment solution (also referred to as coating solution) supplied via the umbilical supply 226.

The coating of surface-treatment solution/polymer is cured by the last IPASS stage 206, which consists of an ultraviolet or thermal curing source. Due to the unique nature of IPASS, the system trails an umbilical 210, 220, 226 (the individual lines of which may in embodiments be combined together within a larger channel) behind the system as it traverses through a pipeline length, which provides the plating/electrolyte solution and surface-treatment/coating solution for application, as well as an electrical supply for the plating stage and curing stage. Control signals may also pass through the umbilical, for example to control the drive stage to start, stop, speed up or slow down the IPASS assembly, and/or to control the plating stage and/or surface treatment stages, to modify the amount of solution dispensed and/or speed at which the stages spin, or other attributes of the application, etc. Amount of solution dispensed may also be controlled in embodiments from the source of the umbilical by the amount of solution provided to the stages, or by control of a local solution reservoir/container dispensing the solution. The control signals may be issued by an operator at a remote command and control center. The drive stage 208 may be a standard prior-art drive of the type used for existing pigs.

Figure 2:
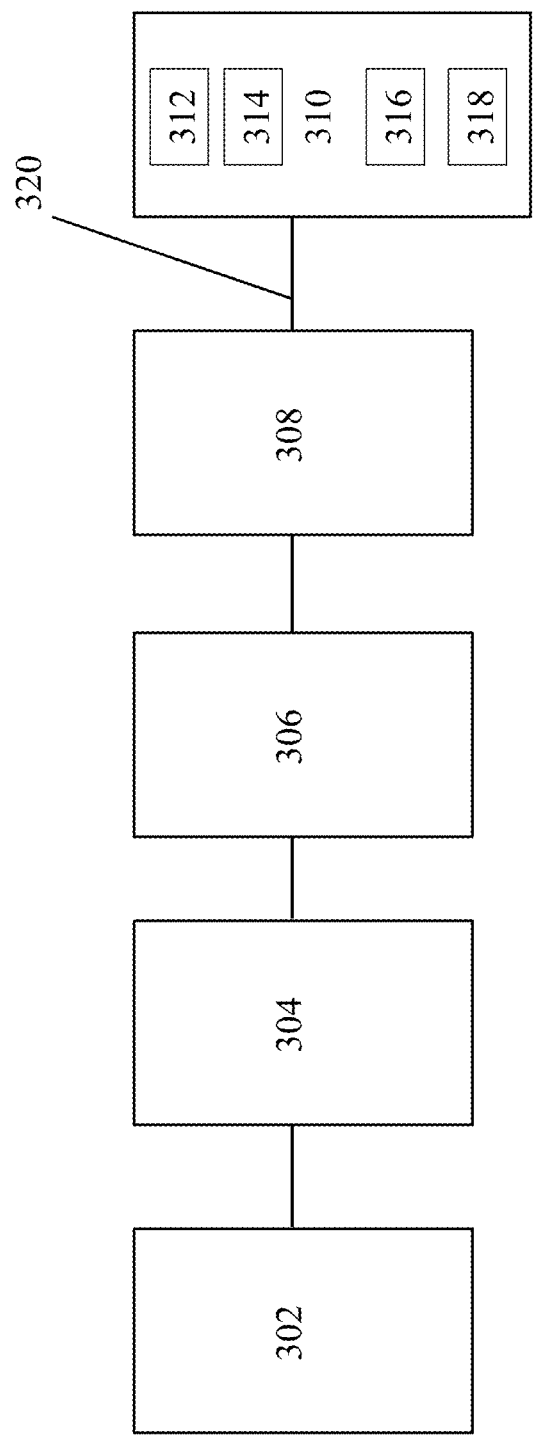
FIG. 2 depicts an IPASS system assembly with a self-powered source of electrical power and plating and coating solutions, in an embodiment.

FIG. 2 depicts an IPASS system assembly with a self-powered source of electrical power and plating and coating solutions, in an embodiment. Plating stage 302, surface treatment stage 304, curing stage 306 and drive stage 308 may be similar to or the same as the corresponding elements in FIG. 2. Instead of umbilicals 210, 220, 226, self-powered system 310 follows behind, driven by known drive mechanism 312 and powered by e.g. battery system 314 and having reservoirs 316, 318 for plating and coating solutions, respectively. Connection(s) 320 run between the self-powered system 310 and modular stages 302-308, carrying electrical power and plating and coating solutions.

The modular configuration of IPASS provides design flexibility to tailor an IPASS vehicle for a specific interior surface re-coating application. The stages may be added, removed, or duplicated within the system to accommodate various applications. As an example, an IPASS vehicle for re-coating 10" inner diameter pipe may require an IPASS assembly using three 1' length plating stages attached to a 3' polymer (surface-treatment) stage followed by a 1' curing stage. Each process stage assembly is connected to the others by a universal joint to allow articulation of the vehicle for traversing pipe bends. Additional stages may be added to the front of the IPASS to clean and/or condition the pipeline's interior (particularly for reconditioning of existing in-use pipelines) prior to application of the initial alloy plating, for favorable plating adhesion. Alternatively, the pipeline's interior may be cleaned and/or reconditioned by a separate prior art pig prior to use of the IPASS.

IPASS provides superior surface protection through a multi-layer application of coating and surface treatment. IPASS can be used to apply various coatings, including coatings that may or may not require electricity to apply.

These and other objectives and features of the invention are apparent in the disclosure, which includes the above and ongoing written specification.

The invention is not limited to the particular embodiments described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the scope of the invention.

We claim:

1. A system, comprising:
    a plurality of modular segments flexibly attached to one another; and
    sources of electrical power and plating and coating solutions;
    wherein the plurality of modular segments comprise:
        a drive stage configured to push the plurality of modular segments along a surface;
        a plating stage configured to apply the plating solution to the surface; and
        a surface treatment application stage configured to apply the coating solution to the surface, which will cure to form a final coating on the surface that is resistant to corrosion and buildup.

2. The system of claim 1, wherein the sources of electrical power and plating and coating solutions are at the rear of the plurality of modular segments.

3. The system of claim 1, wherein the surface treatment application stage is configured to apply the coating solution to the surface under a pre-set operating current density to deposit metal or metal alloy onto the surface.

4. The system of claim 1, further comprising a curing stage configured to cure the coating solution to form the final coating on the surface.

5. The system of claim 1, wherein the plating stage comprises radial applicators configured to apply the plating solution from the source of plating solution to a portion of the surface that surrounds the plating stage and the surface treatment application stage comprises nozzles configured to spray the coating solution from the source of coating solution to a portion of the surface that surrounds the surface-treatment application stage.

6. The system of claim 4, wherein the curing stage is located behind the plating stage and surface treatment application stage and comprises a thermal and/or UV curing device for applying thermal and/or UV energy to a portion of the surface that surrounds the curing stage to cure coating solution applied by the surface treatment application stage.

7. The system of claim 1, wherein the sources of electrical power and plating and coating solutions comprise an umbilical.

8. The system of claim 1, wherein the sources of electrical power and plating and coating solutions comprise a self-powered system at the back of the drive stage configured to drive along a coating path, comprising an electrical power source and reservoirs for plating and coating solutions.

9. The system of claim 1, wherein the final coating comprises a base layer that is corrosion-resistant and a top layer that is resistant to deposits.

10. The system of claim 9, wherein the corrosion-resistant base layer comprises at least one of metal or alloy.

11. The system of claim 10, wherein the metal or alloy comprises at least one of nickel, chromium, cobalt, copper, selenium, zinc, and phosphorus.

12. The system of claim 9, wherein the top layer is a composite coating that is inert to acids, bases, and hydrocarbon-based fluids.

13. The system of claim 9, wherein the top layer is a composite coating that is inert to sulfuric acid, nitric acid, hydrochloric acid, potassium hydroxide and sodium hydroxide.

14. The system of claim 9, wherein the top layer is a composite coating and resists buildup of scale, hydrate, asphaltenes, wax, and debris.

15. The system of claim 9, wherein the top layer is a composite coating comprising perfluoro monomers and/or polymers that are resistant to oil and water.

16. The system of claim 1, wherein the final coating is applicable to iron-based metal tubing and conduits.

17. The system of claim 1, wherein the modular segments have a circular cross-section.

18. The system of claim 1, wherein the modular segments have a rectangular cross-section.

19. The system of claim 1, wherein the surface is planar.

20. The system of claim 1, wherein the plurality of modular segments are flexibly attached to one other by connection points at the front and/or rear of each modular segment.

21. The system of claim 4, wherein the plating stage is located in front of the surface-treatment application stage, and the surface-treatment application stage is located in front of the curing stage.

22. A method, comprising:
    driving a plurality of flexibly attached modular segments along a surface, the plurality of modular segments comprising a drive stage, a plating stage, a surface treatment application stage and a curing stage;
    applying a plating solution to the surface using the plating stage;
    applying a coating solution to the surface using the surface treatment application stage; and
    curing the coating solution using the curing stage to form a final coating on the surface that is resistant to corrosion, chemical attacks and chemical buildup.

23. The method of claim 22, wherein applying the plating solution comprises injecting the plating solution into a metal rotary sponge and moving the sponge against the surface, wherein applying the coating solution comprises spraying the coating solution from nozzles onto the surface, and wherein curing the coating solution comprises applying thermal and/or UV energy to the surface.

* * * * *